United States Patent
Inoue

(10) Patent No.: US 7,915,880 B2
(45) Date of Patent: Mar. 29, 2011

(54) STEP-UP DC-DC CONVERTER

(75) Inventor: Yoshiyuki Inoue, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 447 days.

(21) Appl. No.: 12/219,617

(22) Filed: Jul. 24, 2008

(65) Prior Publication Data

US 2009/0058385 A1  Mar. 5, 2009

(30) Foreign Application Priority Data

Sep. 4, 2007 (JP) ................................ 2007-229318

(51) Int. Cl.
 *G05F 1/40* (2006.01)
(52) U.S. Cl. ......................... 323/282; 323/222; 323/224
(58) Field of Classification Search .................. 323/222, 323/224, 226, 282–288, 266, 275, 299; 363/16, 363/17, 24, 25

See application file for complete search history.

(56) References Cited

U.S. PATENT DOCUMENTS

| 4,812,736 | A | * | 3/1989 | Albach et al. .................. 323/224 |
| 5,247,239 | A | * | 9/1993 | Yamamura et al. ............ 323/272 |
| 5,831,418 | A | * | 11/1998 | Kitagawa ....................... 323/222 |
| 6,166,527 | A | * | 12/2000 | Dwelley et al. ................ 323/222 |
| 6,198,258 | B1 | * | 3/2001 | Ando et al. .................... 323/222 |
| 6,420,858 | B1 | * | 7/2002 | Kitagawa et al. .............. 323/282 |

FOREIGN PATENT DOCUMENTS

| JP | 2001-197727 | 7/2001 |
| JP | 2006-246626 | 9/2006 |

* cited by examiner

*Primary Examiner* — Rajnikant B Patel
(74) *Attorney, Agent, or Firm* — Dickstein Shapiro LLP

(57) ABSTRACT

A step-up DC-DC converter is disclosed that is capable of high efficiency power conversion under both a heavy load condition and a light load condition. The step-up DC-DC converter includes a direct current power source, an inductor, a first switching element, a second switching element, a smoothing capacitor, a driver controller for controlling switching ON or switching OFF the first switching element and the second switching element, and a control changing unit for changing a control operation of the driver controller according to a load current. According to an output from the control changing unit, the driver controller performs one of an operation of switching OFF the second switching element and an operation of switching ON or switching OFF the second switching element.

1 Claim, 5 Drawing Sheets

STEP-UP DC-DC CONVERTER

BACKGROUND OF THE INVENTION

1. Field of the Invention

The present invention relates to a step-up DC-DC converter, and particularly, to a step-up DC-DC converter that synchronizes control operations of a first switching element and a second switching element, and supplies power at an input side to an output side.

2. Description of the Related Art

A frequently used method for a power device to convert an input voltage to a specified output voltage includes power conversion at high efficiency by using a switching DC-DC converter.

The switching DC-DC converter controls a first switching element in synchronization with a second switching element, and this allows formation of channels in the switching elements, and thus, resistance of the switching elements in an ON state can be decreased, and high efficiency power conversion can be performed even under a heavy load. However, although high power conversion efficiency can be obtained under a heavy load, a charging and discharging current occurring when the second switching element switches under a light load becomes non-negligible, so that the overall conversion efficiency lowers.

For example, Japanese Laid Open Patent Application No. 2001-197727 (hereinafter, referred to as "reference 1") discloses a method able to control a first switching element in synchronization with a second switching element, thus reduce resistance of the switching elements in an ON state, and obtain high efficiency power conversion even under a heavy load.

However, in the method disclosed in reference 1, although high efficiency power conversion can be obtained under a heavy load, since the first switching element and the second switching element are both switched on under a light load, while switching element resistance inside a circuit can be reduced, current consumption for charging and discharging the switching element becomes non-negligible, and it is difficult to obtain high efficiency power conversion under a light load.

SUMMARY OF THE INVENTION

The present invention may solve one or more problems of the related art.

A preferred embodiment of the present invention may provide a step-up DC-DC converter able to change a control scheme of a second switching element when a load current is under a heavy load and a light load, and provide high efficiency power conversion under both the heavy load and the light load.

According to an aspect of the present invention, there is provided a step-up DC-DC converter, comprising:

a direct current power source;

an inductor connected to a positive polarity of the direct current power source;

a first switching element connected between the inductor and ground;

a second switching element;

a smoothing capacitor connected to the inductor via the second switching element;

a driver controller configured to control switching ON or switching OFF the first switching element and the second switching element; and a control changing unit configured to change a control operation of the driver controller according to a load current; wherein according to an output from the control changing unit, the driver controller performs one of an operation of switching OFF the second switching element and an operation of switching ON or switching OFF the second switching element.

According to the above embodiment, with a heavy load, the switching DC-DC converter controls the first switching element in synchronization with the second switching element, and this allows formation of channels in the first switching element and the second switching element, and thus, reducing resistance of an ON state, and high efficiency power conversion can be performed even under a heavy load.

As an embodiment of the present invention, since there are two second switching elements connected in series, a back gate of one of the second switching elements is connected to the inductor, and a back gate of other one of the second switching elements is connected to the smoothing capacitor, when the step-up DC-DC converter is in a standby state and the second switching elements are switched OFF, charging the smoothing capacitor with a direct current is prevented.

According to the above embodiment, since two second switching elements are connected in series, the back gate of one second switching element is connected to the inductor, and the back gate of the other second switching element is connected to the smoothing capacitor, when the second switching elements are switched OFF, it is possible to prevent a voltage from being output at an output terminal.

According to an embodiment of the present invention, since the control scheme of the second switching element is changed according to the load current, and the second switching element is kept switched OFF under a light load, the charging and discharging current occurring when the second switching element switches is reduced, current consumption under a light load can be reduced, and it is possible to improve power conversion efficiency under the light load.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention are explained with reference to the accompanying drawings.

Figure 1:
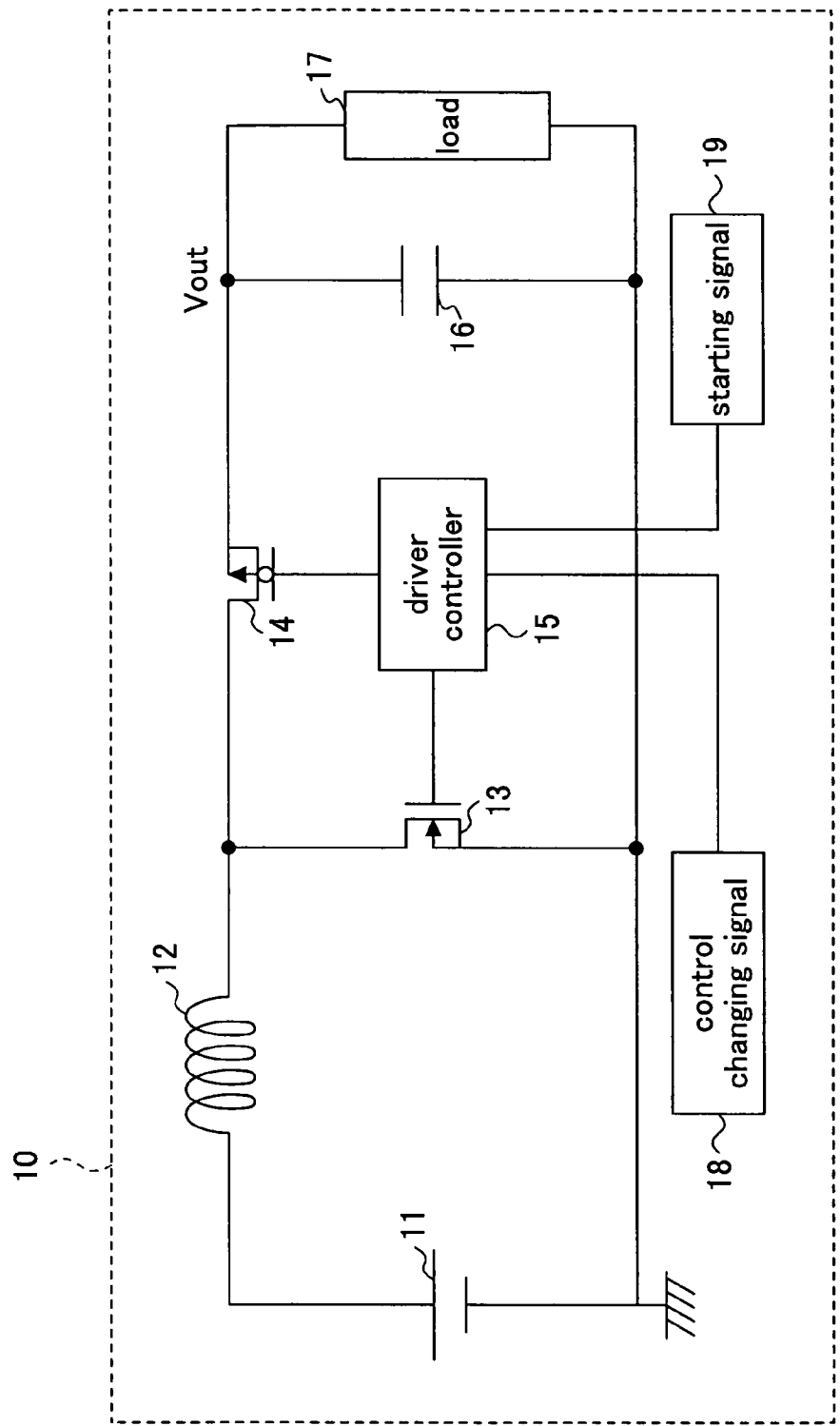
FIG. 1 is a circuit diagram illustrating a configuration of a step-up DC-DC converter according to a first embodiment of the present invention.

FIG. 1 is a circuit diagram illustrating a configuration of a step-up DC-DC converter according to a first embodiment of the present invention.

As shown in FIG. 1, a step-up DC-DC converter 10 of the present embodiment includes an input power source 11, an inductor 12, a first switching element 13 formed of an NMOS transistor, a second switching element 14 formed of a PMOS transistor, a driver controller 15, an output smoothing capacitor 16, and a load 17.

In the step-up DC-DC converter 10, a positive polarity terminal of the input power source 11 is connected to an end of the inductor 12 in series, and a negative polarity terminal of the input power source 11 is connected to ground. The other end of the inductor 12 is connected to both the first switching element 13 and the second switching element 14. The first switching element 13 is connected to a negative polarity terminal of the input power source 11. The second switching element 14 is connected to the output smoothing capacitor 16 in series. A control signal from the driver controller 15 is supplied to gates of the first switching element 13 and the second switching element 14. The driver controller 15 controls a periodic voltage supplied to the first switching element 13 and the second switching element 14 according to an output voltage, and to drive the first switching element 13 and the second switching element 14.

A control changing signal 18 and a starting signal 19 are input to the driver controller 15.

Receiving the starting signal 19, the driver controller 15 starts control operations, and receiving the control changing signal 18, the driver controller 15 changes the control scheme of the second switching element 14. For example, under a light load, the control changing signal 18 is at a high level to switch ON the second switching element 14; under a heavy load, the control changing signal 18 is at a low level to switch OFF the second switching element 14, so as to change the control scheme of the second switching element 14 in response to the conditions of the load conditions.

Specifically, the periodic voltage from the driver controller 15 is applied on the gates of the first switching element 13 and the second switching element 14; when the voltage is applied on the gate of the first switching element 13, the first switching element 13 is turned ON, an electric current flows between the source and the drain of the NMOS transistor constituting the first switching element 13, and energy is stored in the inductor 12.

When the first switching element 13 is turned OFF from an ON state, the second switching element 14 is turned ON from an OFF state, a voltage induced by the energy stored in the inductor 12 is output at the point Vout through the second switching element 14, and induces a current flowing through the load 17; at the same time, the current charges the output smoothing capacitor 16. When the first switching element 13 is turned ON, the second switching element 14 is turned OFF, thus the output smoothing capacitor 16 discharges, thereby inducing a current flowing through the load 17.

Figure 2:
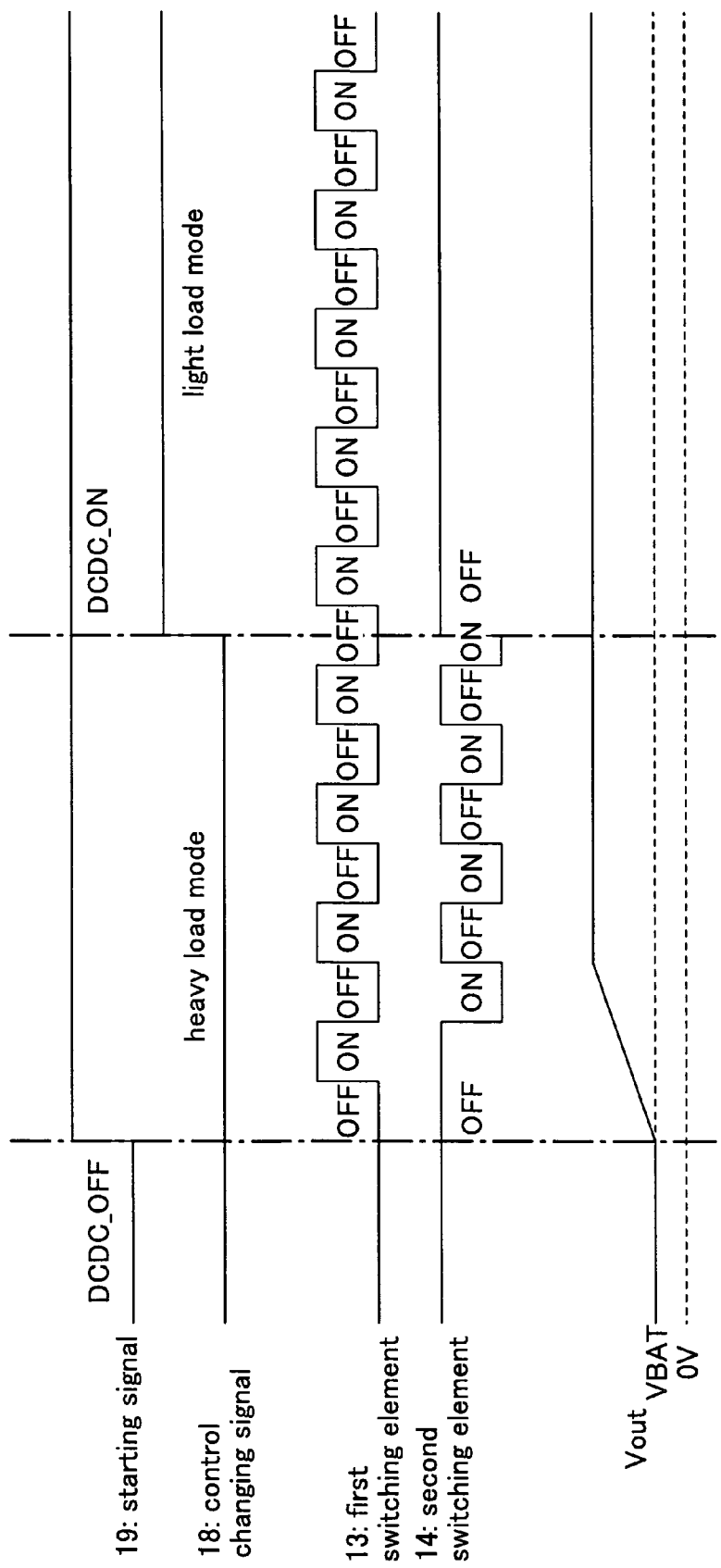
FIG. 2 is a timing chart illustrating operations of the step-up DC-DC converter 10 in FIG. 1.

FIG. 2 is a timing chart illustrating operations of the step-up DC-DC converter 10 in FIG. 1.

As shown in FIG. 2, when the starting signal 19 is in an ON state (high level in FIG. 2), the driver controller 15 starts control operations; when the starting signal 19 is in an OFF state (low level in FIG. 2), the first switching element 13 and the second switching element 14 are turned OFF.

Under a heavy load, when the starting signal 19 is in the ON state, the control changing signal 18 is in the OFF state, and the first switching element 13 is switched ON or switched OFF in synchronization with ON or OFF of the second switching element 14. As a result, channels are formed in the first switching element 13 and the second switching element 14; this reduces the resistance of the first switching element 13 and the second switching element 14 in the ON state, and enables high efficiency power conversion even under the heavy load.

Under the light load, when the starting signal 19 is in the ON state, the control changing signal 18 is in the ON state; upon that, the driver controller 15 changes the control scheme, specifically, the first switching element 13 is switched ON or OFF, and the second switching element 14 is kept OFF.

Since the second switching element 14 is kept OFF under the light load, the charging and discharging current consumed for switching the second switching element is reduced, and this improves the power conversion efficiency under the light load.

The voltage Vout serves as the voltage of the input power source 11 when the starting signal 19 is in the OFF state, and when the starting signal 19 turns to the ON state, the step-up DC-DC converter 10 starts operating and supplies a stable Vout voltage as desired.

A second embodiment of the present invention is described below.

Figure 3:
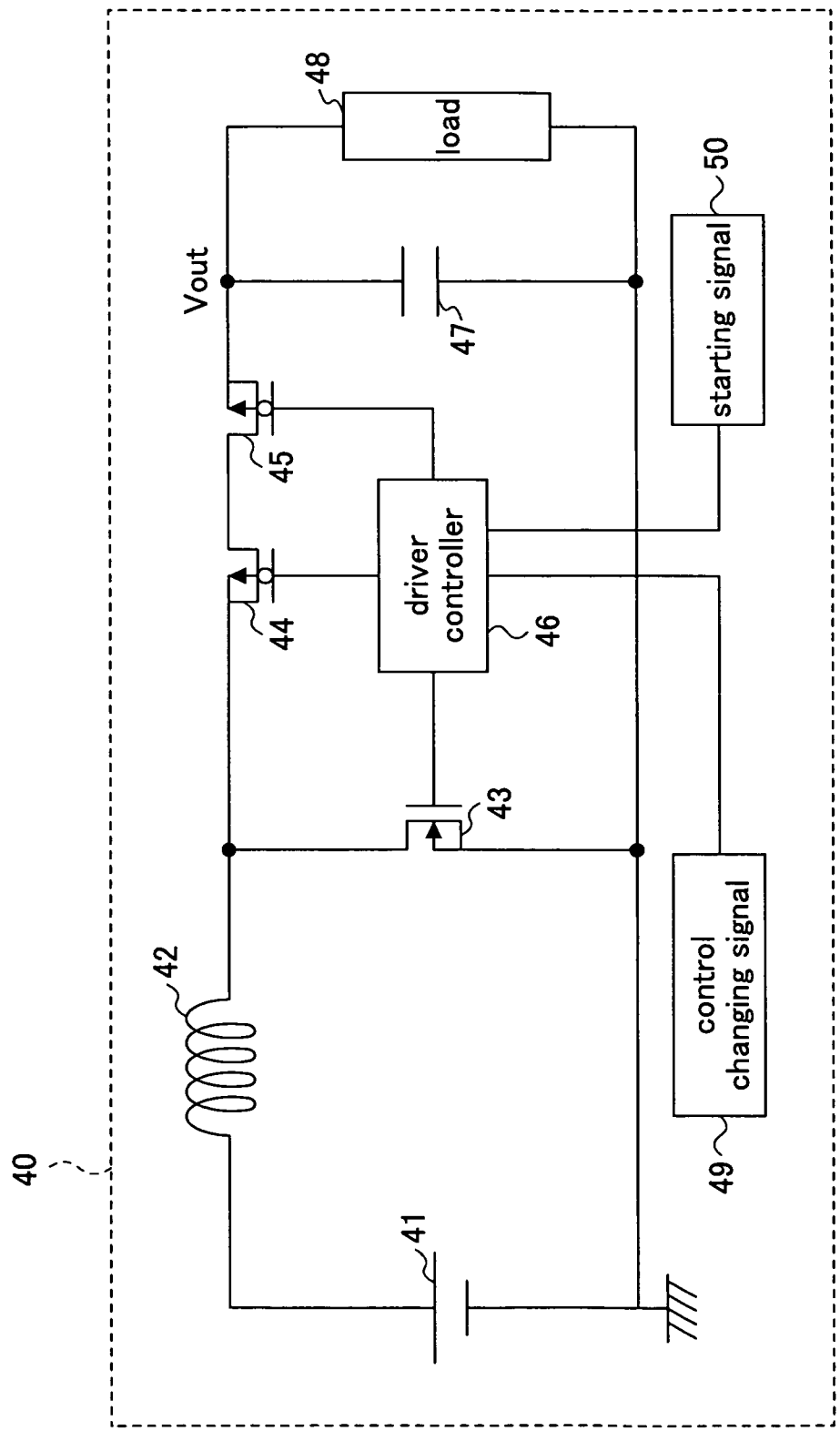
FIG. 3 is a circuit diagram illustrating a configuration of a step-up DC-DC converter according to a second embodiment of the present invention.

FIG. 3 is a circuit diagram illustrating a configuration of a step-up DC-DC converter according to a second embodiment of the present invention.

As shown in FIG. 3, a step-up DC-DC converter 40 of the present embodiment includes an input power source 41, an inductor 42, and a first switching element 43 formed of an NMOS transistor, two second switching elements 44, 45 connected in series and each formed of a PMOS transistor, a driver controller 46, an output smoothing capacitor 47, and a load 48.

In the step-up DC-DC converter 40 of the present embodiment, a positive polarity terminal of the input power source 41 is connected to an end of the inductor 42 in series, and a negative polarity terminal of the input power source 41 is connected to ground. The other end of the inductor 42 is connected to the first switching element 43 and the second switching elements 44, 45. The first switching element 43 is connected to a negative polarity terminal of the input power source 41.

The second switching element 45 is connected to the output smoothing capacitor 47. A control signal from the driver controller 46 is supplied to gates of the first switching element 43 and the second switching elements 44, 45.

A control changing signal 49 and a starting signal 50 are input to the driver controller 46.

Receiving the starting signal 50, the driver controller 46 starts control operations, and receiving the control changing signal 49, the driver controller 46 changes control schemes of the second switching elements 44, 45.

The same as the first embodiment, under a light load, the control changing signal 49 is at a high level (ON state), and under a heavy load, the control changing signal 49 is at a low level (OFF state); thus the control scheme of the second switching elements 44, 45 is changed in response to the load conditions.

As described above, the step-up DC-DC converter 40 of the present embodiment has basically the structure as that of the step-up DC-DC converter 10 of the first embodiment, except that in the present embodiment, there are two second switching elements 44, 45, which are connected in series between the inductor 42 and the point Vout.

In the first embodiment, when the step-up DC-DC converter 10 is turned OFF, the first switching element 13 and the second switching element 14 are turned OFF, and the potential of the second switching element 14 on the inductor side is higher than Vout; hence, when a back gate is connected to the Vout side, charges flow to the Vout side through the substrate, and a voltage is induced in the load 17.

In comparison, in the present embodiment, the back gates of the second switching elements 44, 45 are connected to the inductor side in series; when the step-up DC-DC converter 40 is turned ON, there is no voltage induced on the load 48.

Figure 4:
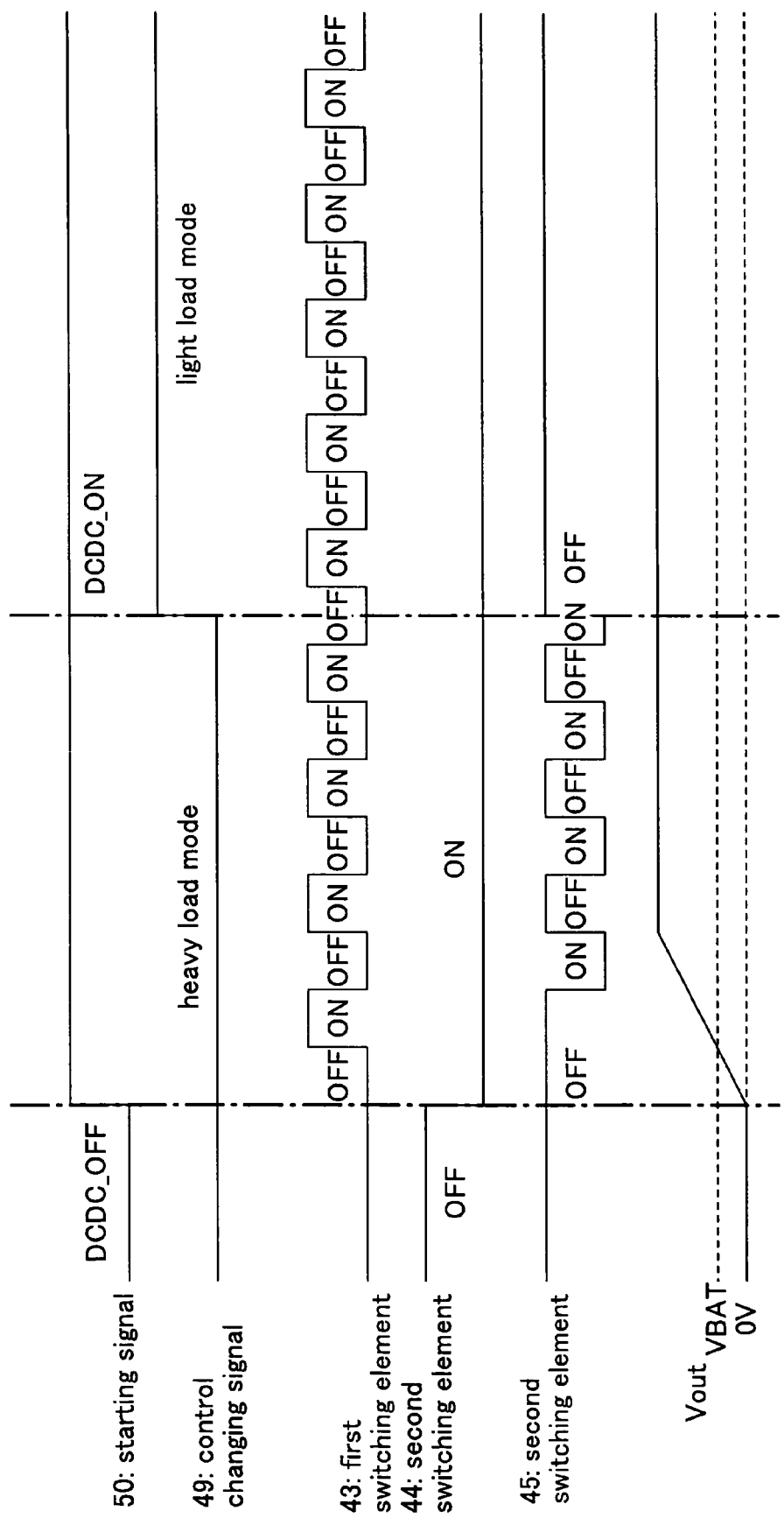
FIG. 4 is a timing chart illustrating operations of the step-up DC-DC converter 10 in FIG. 3.

FIG. 4 is a timing chart illustrating operations of the step-up DC-DC converter 40 in FIG. 3.

As shown in FIG. 4, when the starting signal 40 is in an OFF state, the first switching element 43 and the second switching elements 44, 45 are turned OFF.

When the starting signal 50 is in an ON state (high level in FIG. 4), the driver controller 46 starts control operations. Under a heavy load, when the starting signal 50 is in the ON state, the control changing signal 49 is in the OFF state, and the first switching element 43 is switched ON or switched OFF in synchronization with ON or OFF of the second switching element 45, while the second switching element 44 is maintained in the ON state.

Under a light load, when the starting signal 50 is in the ON state, the control changing signal 49 is in the ON state; upon that, the driver controller 46 changes the control scheme, specifically, the first switching element 43 is switched ON or OFF, the second switching element 44 is kept ON, and the second switching element 45 is kept OFF.

The voltage Vout becomes zero when the starting signal 50 is in the OFF state, and when the starting signal 50 turns to the ON state, the step-up DC-DC converter 40 starts operating and supplies a stable Vout voltage as desired.

Figure 5:
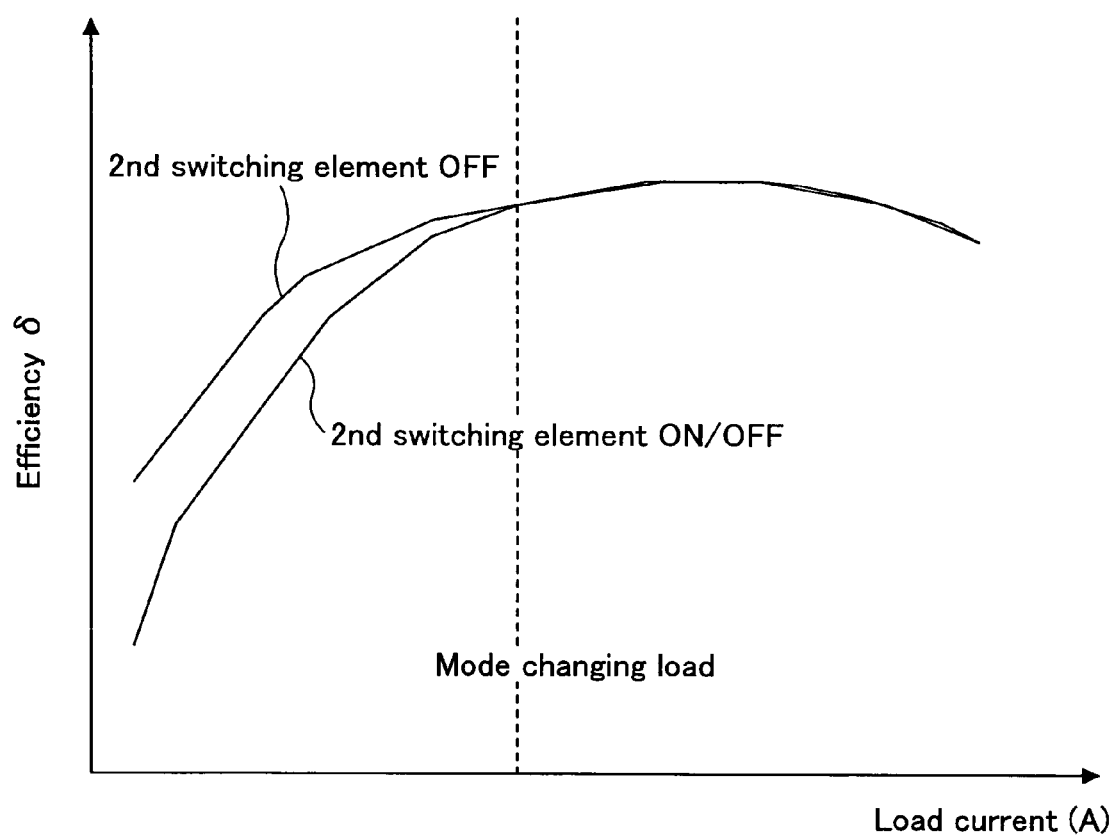
FIG. 5 is a graph showing control schemes of the step-up DC-DC converter of the embodiments of the present invention, where the ordinate represents efficiency of the step-up DC-DC converter, and the abscissa represents a load current.

FIG. 5 is a graph showing control schemes of the step-up DC-DC converters 10 and 40 of the above embodiments of the present invention, where the ordinate represents efficiency of the step-up DC-DC converter and the abscissa represents a load current.

In FIG. 5, the region having a load current greater than the value indicated by the dashed line is referred to as a "heavy-load region", and in the heavy-load region, the control changing signal 18 or the control changing signal 49 is in the OFF state. As shown in FIG. 5, in the heavy-load region, the efficiency curves are almost the same.

In contrast, in the region having a load current lower than the value indicated by the dashed line (referred to as a "light-load region"), the control changing signal 18 or the control changing signal 49 is switched to the ON state. As shown in FIG. 5, in the light-load region, the efficiency curve is at a higher position in FIG. 5 when the second switching element 14 or the second switching element 45 is turned OFF. This is because when the load current is small, the loss occurring, when the second switching element is switched OFF and the output voltage is stabilized by the diode characteristics of the second switching element, is lower than the gate voltage charging and discharging current loss of the second switching element occurring when the second switching element is switched ON and OFF. The embodiment of the present invention makes use of the above effect, and obtains a step-up DC-DC converter capable of high efficiency power conversion even under a light load.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2007-229318 filed on Sep. 4, 2007, the entire contents of which are hereby incorporated by reference.

What is claimed is:

1. A step-up DC-DC converter, comprising:
   a direct current power source;
   an inductor connected to a positive polarity of the direct current power source;
   a first switching element connected between the inductor and ground;
   a second switching element;
   a smoothing capacitor connected to the inductor via the second switching element;
   a driver controller configured to control switching ON or switching OFF the first switching element and the second switching element; and
   a control changing unit configured to change a control operation of the driver controller according to a load current;
   wherein;
   the driver controller performs one of operations of switching OFF the second switching element and switching ON or switching OFF the second switching element according to an output from the control changing unit,
   two of the second switching elements are connected in series, a back gate of one of the second switching elements is connected to the inductor, and a back gate of the other one of the second switching elements is connected to the smoothing capacitor, and
   when the step-up DC-DC converter is in a standby state and the second switching elements are switched OFF, charging the smoothing capacitor with a direct current to is prevented.

* * * * *